US010844780B2

(12) United States Patent
Oh et al.

(10) Patent No.: US 10,844,780 B2
(45) Date of Patent: Nov. 24, 2020

(54) ENGINE SYSTEM HAVING SECONDARY AIR INJECTION DEVICE

(71) Applicants: HYUNDAI MOTOR COMPANY, Seoul (KR); KIA MOTORS CORPORATION, Seoul (KR)

(72) Inventors: Heechang Oh, Suwon-Si (KR); Jong Il Park, Seoul (KR); Hyun Jun Lim, Incheon (KR); Seungwoo Hong, Seoul (KR); Joowon Lee, Yongin-Si (KR); Yeongseop Park, Seoul (KR); Dong Hee Han, Seoul (KR); Hyungbok Lee, Seongnam-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 176 days.

(21) Appl. No.: 16/175,182

(22) Filed: Oct. 30, 2018

(65) Prior Publication Data

US 2019/0309678 A1     Oct. 10, 2019

(30) Foreign Application Priority Data

Apr. 4, 2018   (KR) .................. 10-2018-0039069

(51) Int. Cl.
*F01N 3/02*     (2006.01)
*F02B 39/10*     (2006.01)
(Continued)

(52) U.S. Cl.
CPC .............. *F02B 39/10* (2013.01); *F01N 3/323* (2013.01); *F02M 35/10157* (2013.01); *F02M 35/10255* (2013.01)

(58) Field of Classification Search
CPC .............. F01N 3/323; F02M 35/10255; F02M 35/10157; F02B 39/10; F02B 37/04; F02B 37/10
(Continued)

(56) References Cited

U.S. PATENT DOCUMENTS

| 4,236,492 A | * | 12/1980 | Tholen | ...................... F01P 3/18 123/563 |
| 5,205,120 A | * | 4/1993 | Oblander | .................. F01N 3/22 123/531 |

(Continued)

FOREIGN PATENT DOCUMENTS

WO     WO-2017211564 A1 * 12/2017 .............. F02B 39/10

*Primary Examiner* — Jason D Shanske
(74) *Attorney, Agent, or Firm* — Morgan, Lewis & Bockius LLP

(57) ABSTRACT

An engine system having a secondary air injection device include: an engine having a plurality of cylinders; a first intake line in which intake air supplied into the cylinder flows; a second intake line in which intake air supplied into the cylinder flows; a bypass line connecting the first intake line and the second intake line; a first electric supercharger and a second electric supercharger disposed in the first intake line and the second intake line, respectively; an exhaust manifold connected with the plurality of cylinders; an exhaust line connected with the exhaust manifold such that exhaust gas flows to the exhaust line through the exhaust manifold; an exhaust gas purification device disposed in the exhaust line; and a secondary air injection device injecting air into the exhaust manifold or the exhaust line from the intake line.

3 Claims, 6 Drawing Sheets

(51) Int. Cl.
*F02M 35/10* (2006.01)
*F01N 3/32* (2006.01)

(58) Field of Classification Search
USPC .......................................................... 60/317
See application file for complete search history.

(56) References Cited

U.S. PATENT DOCUMENTS

| | | | |
|---|---|---|---|
| 9,187,073 B2* | 11/2015 | Kim | ........................ F02B 39/10 |
| 9,534,532 B2* | 1/2017 | Eybergen | .............. F02N 15/046 |
| 10,513,976 B2* | 12/2019 | Han | .................... F02B 29/0412 |
| 2005/0109029 A1* | 5/2005 | Busch | ....................... F01N 3/30 |
| | | | 60/605.1 |
| 2018/0163616 A1* | 6/2018 | Han | ................. F02M 35/10163 |

* cited by examiner

ENGINE SYSTEM HAVING SECONDARY AIR INJECTION DEVICE

CROSS-REFERENCE TO RELATED APPLICATION

This application claims priority to and the benefit of Korean Patent Application No. 10-2018-0039069 filed in the Korean Intellectual Property Office on Apr. 4, 2018, the entire contents of which are incorporated herein by reference.

TECHNICAL FIELD

The present disclosure relates to a secondary air injection system. More particularly, the present disclosure relates to an engine system having a secondary air injection system that can use an electric supercharger as a pump for secondary air injection.

BACKGROUND

In general, an intake/exhaust system of a vehicle supplies intake air to an engine through an intake manifold, and the intake air supplied to the engine is discharged to outside through an exhaust manifold after combustion in the engine.

In this case, exhaust gas discharged from the engine includes not only harmless materials such as water vapor ($H_2O$), nitrogen ($N_2$), carbon dioxide ($CO_2$), and the like, but also toxic materials such as carbon monoxide (CO), hydrocarbons (HC), nitrogen oxides (NOx), and the like.

Thus, a secondary air injection system that evokes post combustion by supplying air to the exhaust gas is used in order to remove such toxic materials.

A secondary air injection system according to a conventional art supplies compressed air to an exhaust manifold through a secondary air pump, and then harmful components in the compressed air, supplied to the exhaust manifold, are reduced and then converted to harmless components by a catalytic converter. Through such a process, the exhaust gas is emitted to the outside.

That is, the secondary air pump is used to supply air to an exhaust system at an early operation stage, and the inside of the cylinder is burned richly to reduce harmful components (e.g., unburned hydrocarbons) included in the exhaust gas through the air supplied to the exhaust system.

However, the conventional secondary air injection system requires an additional air pump, thereby causing an increase of the weight, volume, and manufacturing cost of the vehicle.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide an engine system having a secondary air injection device having a new structure that can reduce the weight, volume, and manufacturing cost of a vehicle by eliminating an additional air pump for secondary air injection.

An engine system having a secondary air injection device according to an exemplary embodiment of the present disclosure may include an engine that includes: a plurality of cylinders that generate a driving torque of a vehicle by combustion of a fuel; a first intake line in which intake air supplied into the cylinder flows; a second intake line in which intake air supplied into the cylinder flows; a bypass line connecting the first intake line and the second intake line; a first electric supercharger and a second electric supercharger disposed on the first intake line and the second intake line, respectively; an exhaust manifold connected with the plurality of cylinders; an exhaust line connected with the exhaust manifold and exhaust gas flows therein; an exhaust gas purification device disposed in the exhaust line; and a secondary air injection device injecting air into the exhaust manifold or the exhaust line from the intake line.

The secondary air injection device may include an air injection line that is branched from the first intake line or the bypass line and then joined to the exhaust manifold or the exhaust line; and an air injection valve that is disposed in the air injection line.

The engine system may further comprise a first intake valve that is disposed in the first intake line; a second intake valve that is disposed in the second intake line; and a bypass valve that is disposed in the bypass line.

The first intake valve may be disposed in a downstream side of the first electric supercharger, and the second intake valve may be disposed in an upstream side of the second electric supercharger.

The air injection line may be branched from the intake line between the first intake valve and the first electric supercharger or the intake line between the bypass valve and the first electric supercharger and then joined to the exhaust manifold or the exhaust line.

The engine system may further include a controller for controlling operations of the engine, the electric supercharger, the first intake valve, the second intake valve, the bypass valve and the air injection valve.

The controller may control the first intake valve and the bypass valve to be closed, the first electric supercharger to be operated such that supercharged air is generated in the first intake line and the bypass line, and adjust an opening of the air injection valve such that the supercharged air is supplied to the exhaust manifold or the exhaust line.

The first intake line and the second intake line are joined to a main intake line, and a main intercooler is disposed in the main intake line.

The engine system may further include a complementary intercooler that is disposed in the bypass line.

According to the exemplary embodiments of the present disclosure, the engine system having the secondary air injection device can perform secondary air injection to an exhaust system by using an electric supercharger, and accordingly, an additional air pump for secondary air injection can be omitted and manufacturing cost of a vehicle can be reduced.

BRIEF DESCRIPTION OF THE DRAWINGS

The accompanying drawings are provided in order to describe exemplary embodiments of the present disclosure, such that technical idea of the present disclosure is not limited to the accompanying drawings.

DETAILED DESCRIPTION OF THE EMBODIMENTS

Figure 1:
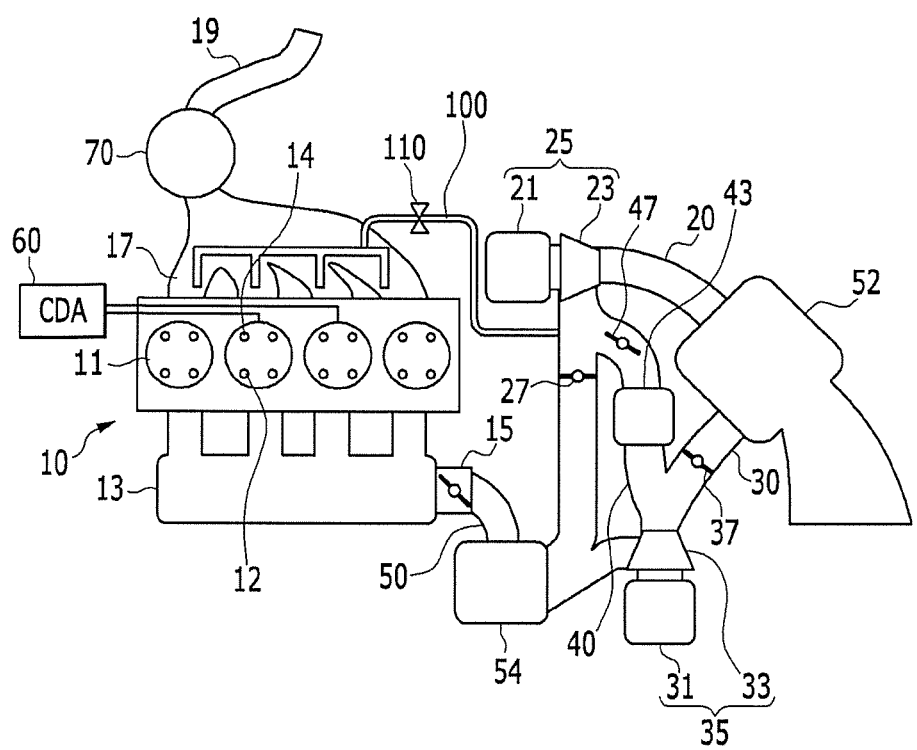
FIG. 1 is a schematic view of an engine system having a secondary air injection device according to an exemplary embodiment of the present disclosure.

The present disclosure will be described more fully hereinafter with reference to the accompanying drawings, in which exemplary embodiments of the invention are shown. As those skilled in the art would realize, the described embodiments may be modified in various different ways, all without departing from the spirit or scope of the present disclosure.

The drawings and description are to be regarded as illustrative in nature and not restrictive. Like reference numerals designate like elements throughout the specification.

Since the size and the thickness of each configuration shown in drawings are arbitrarily indicated for better understanding and ease of description, the present disclosure is not limited to shown drawings, and the thickness of layers, films, panels, regions, etc., are exaggerated for clarity.

Hereinafter, a secondary air injection device according to a first exemplary embodiment of the present disclosure will be described in detail with reference to the accompanying drawings.

Figure 2:
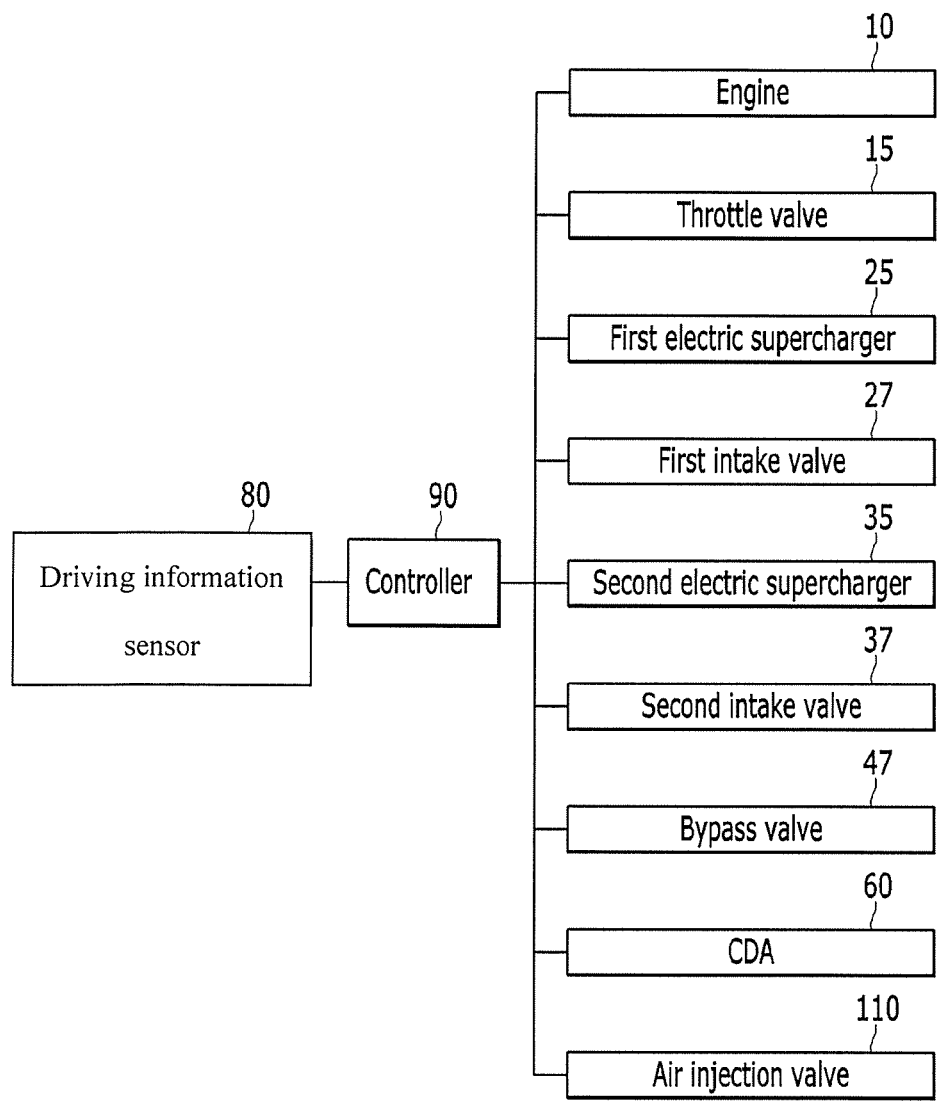
FIG. 2 is a block diagram of an engine system having a secondary air injection device according to an exemplary embodiment of the present disclosure.

FIG. 1 is a schematic view of an engine system having a secondary air injection device according to an exemplary embodiment of the present disclosure. FIG. 2 is a block diagram of an engine system having a secondary air injection device according to an exemplary embodiment of the present disclosure.

As shown in FIG. 1 and FIG. 2, an engine system having a secondary air injection device according to an exemplary embodiment of the present disclosure includes an engine 10 that includes a plurality of cylinders 11 that generate a driving torque of a vehicle by combustion of a fuel, a plurality of intake lines in which intake air supplied to the cylinders 11 flows, a first electric supercharger 25 and a second electric supercharger 35 that are disposed on the plurality of intake lines, respectively, an exhaust system having an exhaust manifold 17 and an exhaust line 19 that is connected with the cylinders 11 and exhaust gas is discharged, and a secondary air injection device that injects air into the exhaust system (exhaust manifold and/or exhaust line).

An intake valve 12 is selectively opened/closed to supply air to the cylinder through an intake manifold 13. That is, the intake valve 12 is open during an intake stroke to supply air to the cylinder through the intake manifold 13 and is closed during an exhaust stroke.

An exhaust valve 14 is selectively opened/closed to exhaust the exhaust gas generated from the cylinder to the exhaust manifold. That is, the exhaust valve 14 is closed during the intake stroke, and opened during the exhaust stroke to exhaust the exhaust gas from the cylinder to the exhaust manifold.

Intake air is supplied to the cylinders 11 of the engine 10 passing through the plurality of intake lines, and exhaust gas discharged from the cylinders 11 is exhausted to the outside through the exhaust manifold 17 and the exhaust line 19. In this case, an exhaust gas purification device 70 is disposed on the exhaust line 19. The exhaust gas purification device 70 may be a catalytic converter or a diesel particulate filter (DPF) in case of a diesel engine.

The plurality of intake lines includes a first intake line 20 and a second intake line 30 which external air supplied to the cylinders 11 flows. However, this is not restrictive.

A bypass line 40 which connects the first intake line 20 and the second intake line 30 is disposed between the first intake line 20 and the second intake line 30. That is, the bypass line 40 is branched from the first intake line 20 and merged into the second intake line 30.

The first and second electric superchargers 25 and 35 disposed in the first intake line 20 and the second intake line 30, respectively, are for supplying compressed air to the cylinders. The first electric supercharger includes a motor 21 and an electric compressor 23, and the second electric supercharger includes a motor 31 and an electric compressor 33. The electric compressors 23 and 33 are operated by the motors 21 and 31, respectively, and compress intake air, and the compressed intake air is supplied to the cylinders 11.

A first intake valve 27 is disposed in the first intake line 20. The first intake valve 27 may be disposed in a downstream portion of the first electric supercharger 25 disposed in the first intake line 20. Intake air amount supplied through the first intake line 20 is adjusted by opening of the first intake valve 27.

A second intake valve 37 is disposed in the second intake line 30. The second intake valve 37 may be disposed in a downstream portion of the second electric supercharger 35 disposed in the second intake line 30. Intake air amount supplied through the second intake line 30 is adjusted by opening of the second intake valve 37.

The first intake line 20 and the second intake line 30 are merged into a main intake line 50, and a main intercooler 54 is disposed in the main intake line 50. Supercharged air compressed by the electric supercharger is cooled by the main intercooler 54.

A bypass valve 47 is disposed in the bypass line 40. A complementary intercooler 43 may be disposed in the bypass line 40. Supercharge air compressed by the first electric supercharger 25 is cooled by the complementary intercooler 43.

An air cleaner 52 for filtering external air is disposed in an entrance of the first intake line 20 and the second intake line 30.

External air inflowing through the first intake line 20 and the second intake line 30 is supplied to the cylinders 11 through an intake manifold 13. A throttle valve 15 is disposed in the intake manifold 13, and adjusts air amount supplied to the cylinder 11.

The secondary air injection device injects air into an exhaust system (exhaust manifold and/or exhaust line) from the intake line, and includes an air injection line 100 and an air injection valve 110 disposed in the air injection line 100.

The air injection line 100 is branched from the first intake line 20 or the bypass line 40 and joined to the exhaust manifold 17 or the exhaust line 19. The air injection valve 110 is disposed in the air injection line 100 and air amount supplied to the exhaust system by opening of the air injection valve 110.

The engine system according to an exemplary embodiment of the present disclosure may further include a cylinder deactivation (CDA) system 60 selectively deactivating some of the plurality of cylinders 11.

The CDA system 60 may control some of the cylinders, and selectively deactivates some of the cylinders. When the CDA system 60 is operated, fuel is not supplied to a deactivated cylinder, and operation of an intake valve 12 and an exhaust valve 14 is stopped.

The CDA system 60 is widely known in the art, and therefore, detailed description thereof is omitted herein.

The CDA system 60 may control a second cylinder and a third cylinder among four cylinders.

The engine system according to an exemplary embodiment of the present disclosure may further include a driving information sensor 80 detecting driving information of a vehicle, and a controller 90 controlling operations of the first intake valve 27, the second intake valve 37, the bypass valve 47, the first electric supercharger 25, the second electric supercharger 35, the CDA system 60, the throttle valve 15 and the air injection valve 110 based on the driving information.

The driving information sensor 80 detects the driving information including an engine torque, an engine speed, and a required torque of a driver. The driving information is then transmitted to the controller 90.

The controller 90 may be provided as at least one processor operating by a predetermined program, and the predetermined program performs each step of a method for controlling the engine system according to an exemplary embodiment of the present disclosure. The controller 90 may be an electronic control unit (ECU).

Hereinafter, operations of the engine system having the secondary air injection device according to an exemplary embodiment of the present disclosure will be described in detail with reference to accompanying drawings.

The controller 90 determines a driving region of the engine based on the driving information detected by the driving information sensor 80. The driving region may be divided into a low speed and low load region, a low and middle speed and high load region, and a high speed and high load region.

The controller 90 adjusts supercharged air amount supplied to the cylinders 11 through controlling the first intake valve 27, the second intake valve 37 and the bypass valve 47 based on the driving region of the engine. That is, the controller 90 controls opening and closing of the first intake valve 27, the second intake valve 37 and the bypass valve 47, or opening degree of the first intake valve 27, the second intake valve 37 and the bypass valve 47, such that supercharged air amount supplied to the cylinders 11 is adjusted.

In addition, the CDA system 60 may be embedded in or connected to the controller 90 such that the controller 90 can control deactivation of cylinders.

Figure 3:
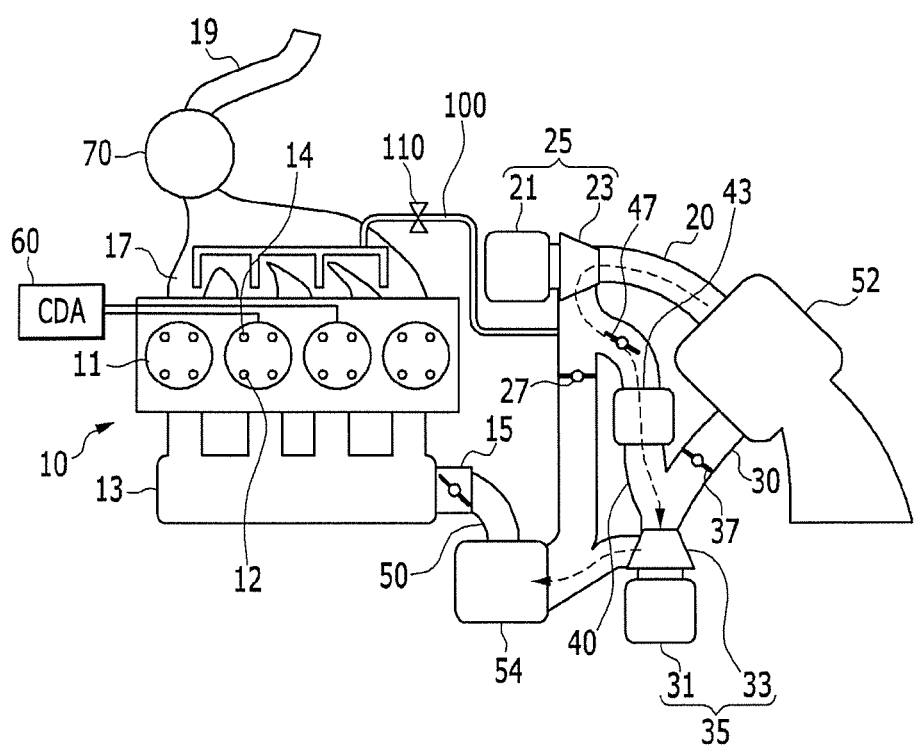
FIG. 3 is a schematic view illustrating an operation of an engine system having a secondary air injection device according to an exemplary embodiment of the present disclosure in a low and middle speed and high load region.

Referring to FIG. 3, in the low and middle speed and high load region, the controller 90 controls that the first intake valve 27 and the second intake valve 37 are closed and controls opening degree of the bypass valve 47, such that supercharged air amount supplied to the cylinder 11 is adjusted. Further, the controller 90 operates the first electric supercharger 25 and the second electric supercharger 35, such that supercharged air by the first electric supercharger 25 and the second electric supercharger 35 is supplied to the cylinder 11.

That is, external air inflowing through the first intake line 20 is primarily compressed by the electric supercharger 25, and the external air flows into the second intake line 30 passing through the bypass line 40. Then, the external air is additionally compressed by the second electric supercharger 35.

Since high compression ratio is needed in the low and middle speed and high load region, it is possible to increase the compression ratio of external air supplied to the cylinder 11 by operating the first electric supercharger 25 and the second electric supercharger 35 in series. Further, since external air compressed by the electric supercharger 25 is cooled by the complementary intercooler 43, compression efficiency of external air can be improved.

Figure 4:
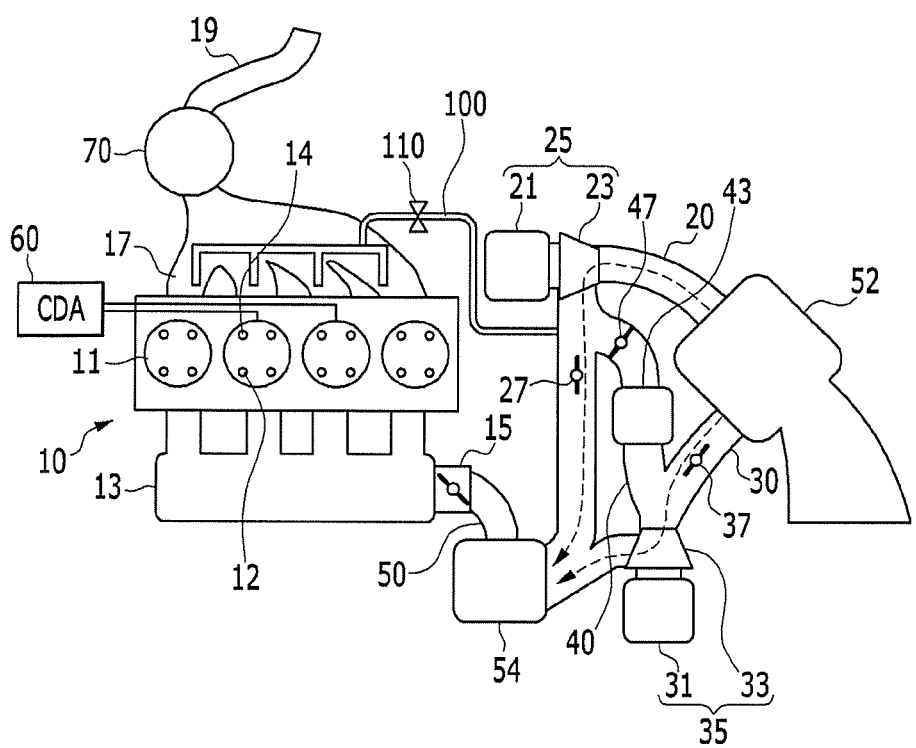
FIG. 4 is a schematic view illustrating an operation of an engine system having a secondary air injection device according to an exemplary embodiment of the present disclosure in a high speed and high load region.

Referring to FIG. 4, in the high speed and high load region, the controller 90 controls that the bypass valve 47 is closed and controls opening degree of the first intake valve 27 and the second intake valve 37, such that supercharged air amount supplied to the cylinders 11 is adjusted. Further, the controller 90 operates the first electric supercharger 25 and the second electric supercharger 35, such that supercharged air by the first electric supercharger 25 and the second electric supercharger 35 is supplied to the cylinders 11.

Since a lot of external air supplied to the cylinders is necessary in the high speed and high load region, external air is supplied to the cylinders through the first intake line 20 and the second intake line 30. In this case, a lot of external air can be supplied to the cylinders 11 by operating the first electric supercharger 25 and the second electric supercharger 35 in parallel.

Figure 5:
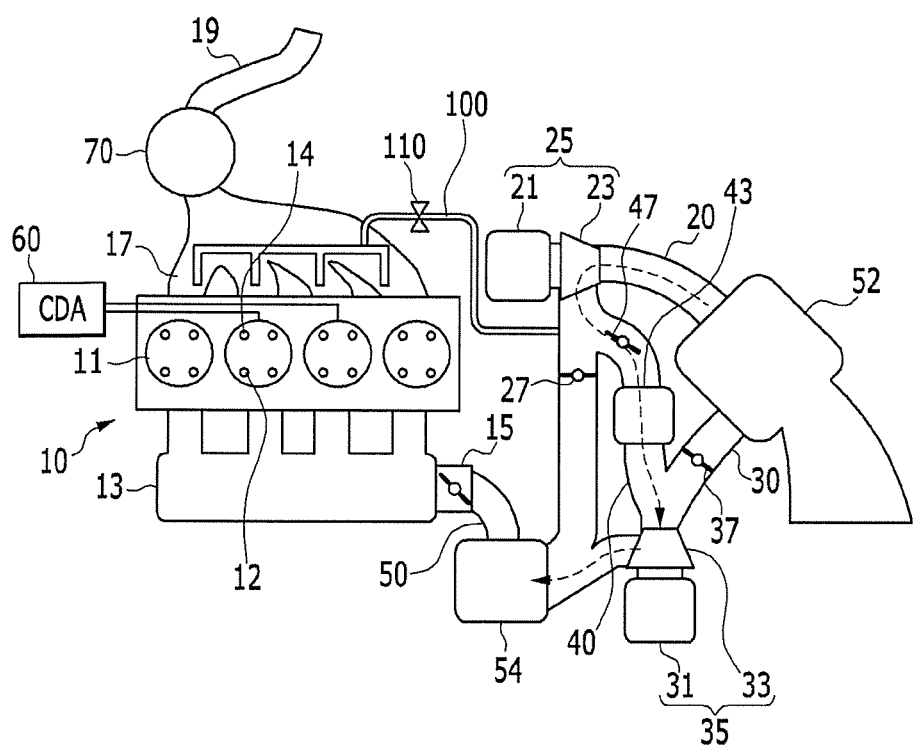
FIG. 5 is a schematic view illustrating an operation of an engine system having a secondary air injection device according to an exemplary embodiment of the present disclosure in in a low speed and low load region.

Referring to FIG. 5, in the low speed and low load region, the controller 90 deactivates some of the cylinders 11 by operating the CDA system 60. The controller 90 controls that the first intake valve 27 and the second intake valve 37 are closed and controls opening degree of the bypass valve 47, such that supercharged air amount supplied to the cylinders 11 is adjusted. Then, the controller 90 operates the first electric supercharger 25 and the second electric supercharger 35, such that that supercharged air by the first electric supercharger 25 and the second electric supercharger 35 is supplied to the cylinders 11.

That is, external air inflowing through the first intake line is primarily compressed by the electric supercharger 25, and the external air flows into the second intake line 30 passing through the bypass line 40. Then, the external air is additionally compressed by the second electric supercharger 35.

Since some cylinders are deactivated in the low speed and low load region (the driving region in which the CDA system operates), unnecessary pumping loss is reduced and fuel consumption can be improved. Further, since supercharged air is supplied to the cylinder 11 by using two electric superchargers in the low speed and low load region, the driving region in which the CDA system operates can be expanded.

Figure 6:
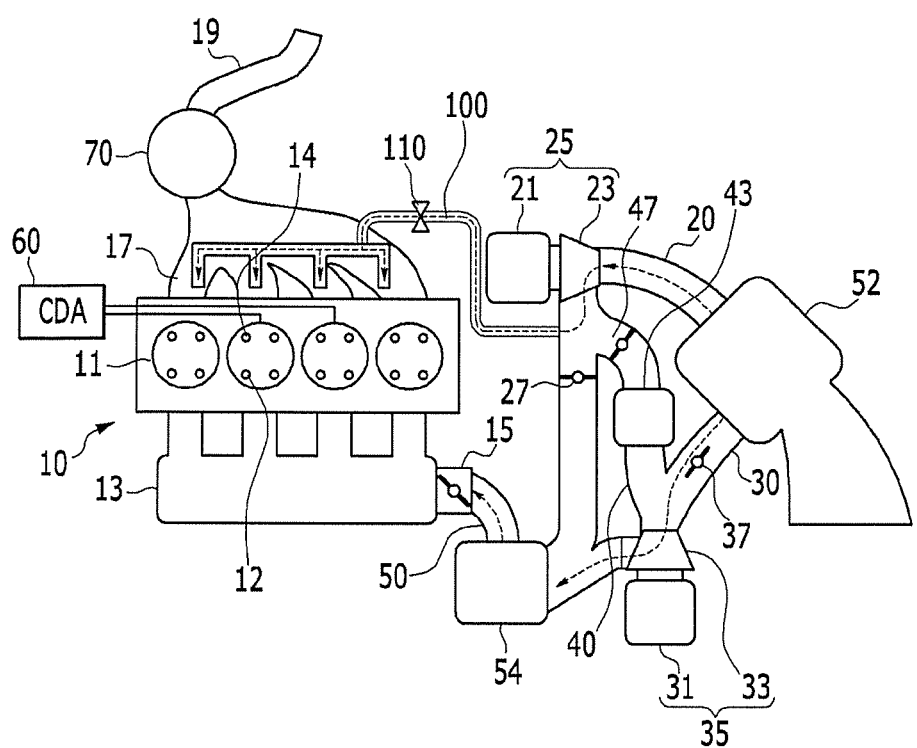
FIG. 6 is a schematic view illustrating an operation of an engine system having a secondary air injection device according to an exemplary embodiment of the present disclosure when secondary air is injected.

Referring to FIG. 6, when air needs to be supplied to the exhaust system (exhaust manifold and/or exhaust line), the controller 90 controls that the first intake valve 27 and the bypass valve 47 are closed, and operates the first electric supercharger 25 such that supercharged air is generated in the first intake line 20 between the first electric supercharger 25 and the first intake valve 27 or the bypass line 40 between the first electric supercharger 25 and the bypass valve 47. When the controller 90 controls that the air injection valve 110 is opened, air is supplied to the exhaust system from the first intake line 20 and/or the bypass line 30 by supercharged pressure. At this time, when an opening degree of the air injection valve 110 is adjusted, air amount supplied to the exhaust system is adjusted.

Then, exhaust gas is post-combusted by the secondary air supplied to the exhaust system such that harmful components included in the exhaust gas are removed. In addition, intake air is supplied to the cylinder of the engine 10 through the second line 30.

At this time, intake air is compressed by the second electric supercharger 35 and supplied passing through the second intake line 30.

In the engine system having the secondary air injection device according to the above-described exemplary embodiments of the present disclosure, the second electric supercharger 35 performs a function as a conventional air pump for secondary air injection, and thus no additional air pump for secondary air injection is required.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An engine system having a secondary air injection system for a vehicle, the engine system comprising:
   an engine having a plurality of cylinders that generate a driving torque of the vehicle by combustion of a fuel;
   a first intake line in which intake air supplied into the plurality of cylinders flows;
   a second intake line in which intake air supplied into the plurality of cylinders flows;
   a bypass line connecting the first intake line and the second intake line;
   a first electric supercharger and a second electric supercharger disposed on the first intake line and the second intake line, respectively;
   an exhaust manifold connected with the plurality of cylinders;
   an exhaust line connected with the exhaust manifold such that exhaust gas flows to the exhaust line through the exhaust manifold;
   an exhaust gas purification device disposed in the exhaust line;
   a secondary air injection device arranged between the exhaust manifold and the first intake line and configured to inject air;
   a first intake valve disposed in the first intake line;
   a second intake valve disposed in the second intake line; and
   a bypass valve disposed in the bypass line,
   wherein the secondary air injection device includes:
      an air injection line branched from the first intake line and then joined to the exhaust manifold; and
      an air injection valve disposed in the air injection line,
   wherein the first intake valve is disposed in the first intake line downstream of the first electric supercharger, and
   wherein the second intake valve is disposed in the second intake line upstream of the second electric supercharger,
   wherein the air injection line is branched from the first intake line between the first intake valve and the first electric supercharger and then joined to the exhaust manifold,
   wherein the engine system further comprises a controller for controlling operations of the engine, the first and second electric superchargers, the first and second intake valves, the bypass valve, and the air injection valve, and
   wherein the controller controls the first intake valve and the bypass valve to be closed, controls the first electric supercharger to be operated such that supercharged air from the first electric supercharger is generated in the first intake line and the bypass line, and adjusts an opening of the air injection valve such that the supercharged air from the first electric supercharger is supplied to the exhaust manifold.

2. The engine system of claim 1, wherein the first intake line and the second intake line are joined to a main intake line, and a first intercooler is disposed in the main intake line.

3. The engine system of claim 1, further comprising a second intercooler that is disposed in the bypass line.

* * * * *